(12) United States Patent
Babovka

(10) Patent No.: US 7,997,535 B2
(45) Date of Patent: Aug. 16, 2011

(54) LIFE PARACHUTE ESPECIALLY FOR ULTRA-LIGHTWEIGHT AIRCRAFTS

(76) Inventor: Milan Babovka, Liberec (CZ)

( * ) Notice: Subject to any disclaimer, the term of this patent is extended or adjusted under 35 U.S.C. 154(b) by 797 days.

(21) Appl. No.: 12/010,479

(22) Filed: Jan. 25, 2008

(65) Prior Publication Data
US 2008/0191098 A1 Aug. 14, 2008

(30) Foreign Application Priority Data
Jan. 25, 2007 (CZ) .................. PUV 2007-18488

(51) Int. Cl.
*B64D 17/18* (2006.01)
*B64D 17/62* (2006.01)
(52) U.S. Cl. ..................... 244/145; 244/149
(58) Field of Classification Search ............. 244/142, 244/145, 138 A, 152, 149
See application file for complete search history.

(56) References Cited

U.S. PATENT DOCUMENTS

| | | | | |
|---|---|---|---|---|
| 1,771,261 A | * | 7/1930 | Lendner | 244/142 |
| 2,764,375 A | | 9/1956 | Lemoigne | |
| 3,228,636 A | | 1/1966 | Lemoigne | |
| 3,385,540 A | * | 5/1968 | Basnett | 244/152 |
| 3,504,874 A | | 4/1970 | Lemoigne | |
| 3,508,726 A | | 4/1970 | Lemoigne | |
| 3,690,603 A | | 9/1972 | Lemoigne | |
| 3,809,342 A | | 5/1974 | Lemoigne | |
| 3,840,202 A | | 10/1974 | Lemoigne | |
| 4,487,384 A | * | 12/1984 | Astrand | 244/152 |
| 4,586,685 A | | 5/1986 | Kostelezky | |
| 4,588,149 A | * | 5/1986 | Gold | 244/145 |
| 4,678,145 A | * | 7/1987 | Buehrer et al. | 244/152 |
| 4,863,119 A | * | 9/1989 | Case et al. | 244/152 |
| 5,839,695 A | * | 11/1998 | Puskas | 244/145 |
| 6,843,451 B1 | * | 1/2005 | Fox, Jr. | 244/152 |
| 7,000,872 B1 | * | 2/2006 | Fujiwara et al. | 244/142 |
| 7,293,742 B2 | * | 11/2007 | Sadeck | 244/149 |
| 7,578,480 B2 | * | 8/2009 | Bennett et al. | 244/149 |

FOREIGN PATENT DOCUMENTS

| | | |
|---|---|---|
| FR | 874033 | 7/1942 |
| FR | 1392553 | 2/1965 |
| GB | 2222121 | 2/1990 |

OTHER PUBLICATIONS

Great Britain Patent Specification No. 909,631, published Oct. 31, 1962, 7 pages.
Great Britain Patent Specification No. 1,079,485, published Aug. 16, 1967, 6 pages.

* cited by examiner

*Primary Examiner* — Tien Dinh
(74) *Attorney, Agent, or Firm* — Jacobson Holman PLLC

(57) ABSTRACT

A life parachute for ultra-lightweight aircrafts or for lightweight aircrafts includes a canopy of the parachute fitted with a pole opening and at least some wedge-shaped section of the canopy at the top half of its height is fitted with a discharge valve of air from the inside space of the canopy and a slider is installed at suspension parachute cords. The slider is formed in a ring fitted with a central opening surrounded with netting having, at least in peripheral edges, a local stiffener. Through openings are formed for the suspension parachute cords. The discharge valves are in the width of the single wedge-shaped sections, overlapped with parachute material, with a bottom open end. The discharge valves of the air are formed either with loose vents or at the open end of the parachute material. The slider is, advantageously, in the form of a regular polygon composed of single tetrahedral parts of the netting which are connected to one another through the local stiffeners. The through openings are for the suspension parachute cords.

8 Claims, 9 Drawing Sheets

LIFE PARACHUTE ESPECIALLY FOR ULTRA-LIGHTWEIGHT AIRCRAFTS

TECHNICAL FIELD

The technical solution relates to a parachute structure especially for ultra-lightweight aircrafts. This structure is characterized in a set of changes which make possible to use the life parachute also in small heights of ultra-lightweight aircrafts in cases of an arisen need or their considerable defects. The life parachute comprises a canopy formed with single wedge-shaped canopy sections which bottom edges in are clamped suspension parachute cords with a possibility of suspending a rescued object. The life parachute is composed of a parachute pack placed in a container fixed clamped at the airframe.

PRIOR ART

The ultra-lightweight or lightweight aircrafts are today usually equipped with the life parachute wherein the structure of these life parachutes are different in single cases of their manufacturers. The effort is always to reach a reliable and especially fast opening of the life parachute with the elimination of considerable overload at the moment of full opening of the life parachute. The purpose of the technical solution is also structure changes of the life parachute leading to the fulfillment of these claims.

SUMMARY OF THE INVENTION

The life parachute according to the technical solution combines three changes at its structure. The first change is the pole opening in the canopy of the life parachute, the second change is the discharge valves for air situated inside of the canopy made at least in some wedge-shaped sections of the canopy and that is in the upper half of its height, and the third change is the use of the slide in the form of a ring fitted with a centric opening which is surrounded with netting comprising at least in peripheral edges of the slide, local stiffeners which in are formed through openings for suspension parachute cords where the slider is situated at. The discharge valves are, in the width of single wedge-shaped sections, overlapped with parachute material of which bottom end is open for leaking air from the inside space of the canopy through these discharge valves.

The discharge valves in the wedge-shaped sections of the canopy are formed either with loose vents or netting.

One advantage is in the bottom open end of the parachute material overlapping the discharge valves having a strip of elastic material which clamps the bottom open end of the parachute material to the outer surface of the canopy during pressure drop of air flowing through the discharge valves. By an alternative type of life parachute according to the technical solution an antiflap can be also sewn up under the bottom open end of the parachute material and from the outer side of the canopy in the width of its wedge-shaped section. The antiflap is made of textile material and its height is chosen to overlap the open loose end of the parachute material during pressure drop of air flowing through the discharge valves.

According to the technical solution the slider or a glider is of a circular figure with a circular centre opening or with a regular many-sided centre opening. The slider can be formed advantageously in the form of a regular polygon composed of single tetrahedral parts of netting which are connected to one another through local stiffeners wherein there is again a through opening for the suspension parachute cord or the suspension parachute cords. The local stiffeners are of textile material and can be either of the half-round form or the triangular or quadrangle form. They are located between the peripheral edge of the slide and the central opening of the slide. They are formed either with flat material or of some bands securing their stiffness. Stiffened are also edges of through openings for suspension parachute cords and the through openings are formed in the local stiffeners. The perimeter of the central opening of the slider and/or the peripheral edge of the slider is fixed with a stiffening strip of textile material and this is its outer perimeter.

BRIEF DESCRIPTION OF THE DRAWINGS

The life parachute according to the technical solution is in exemplary types and schematically shown in drawings wherein.

DETAILED DESCRIPTION OF THE PREFERRED EMBODIMENTS

Figure 1:
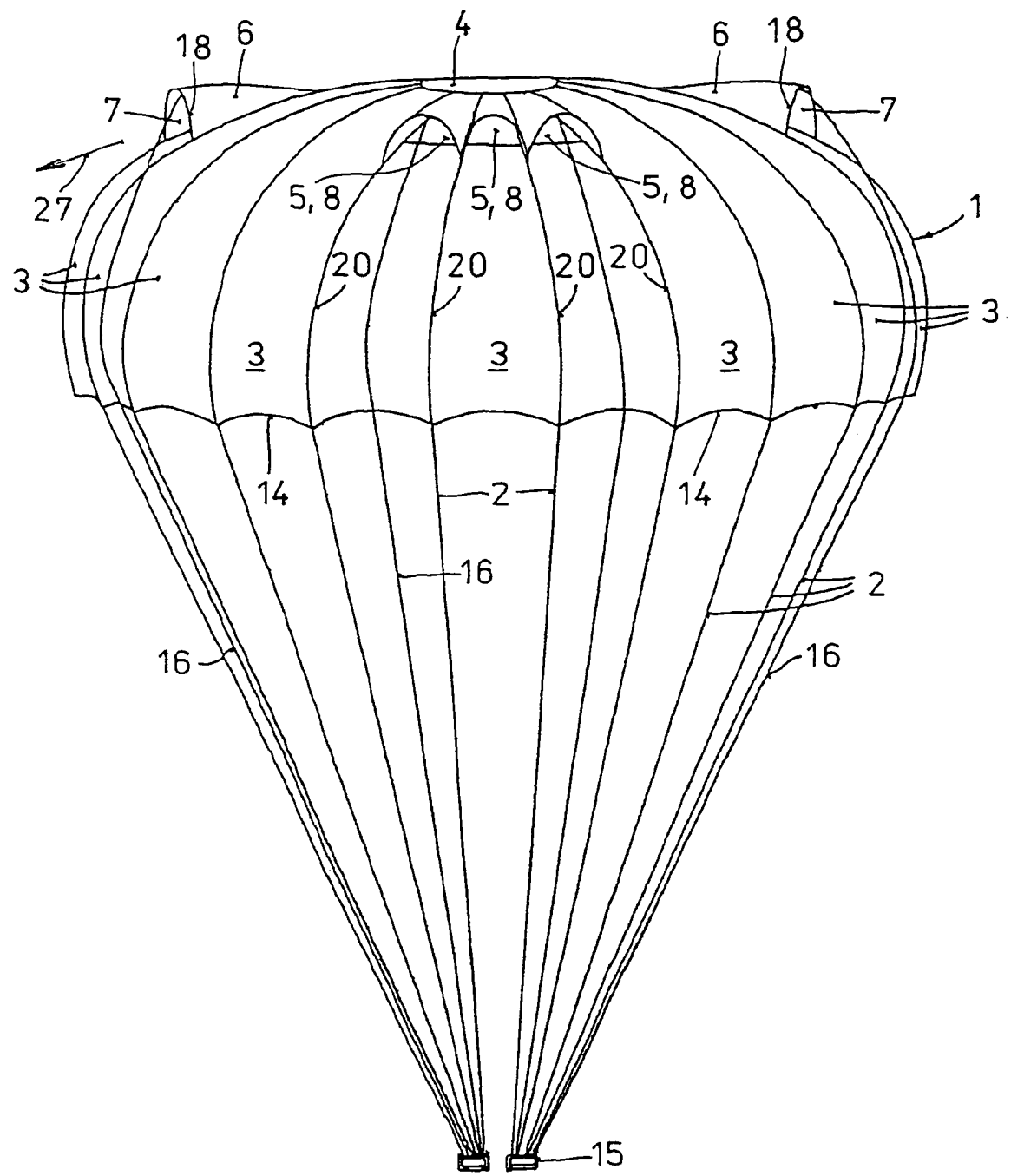
FIG. 1 is a lateral view of the life parachute with the full open canopy including its suspension parachute cords.
Figure 8:
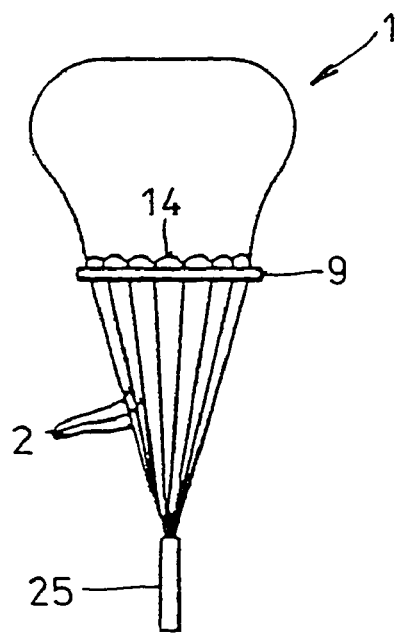
Figure 9:
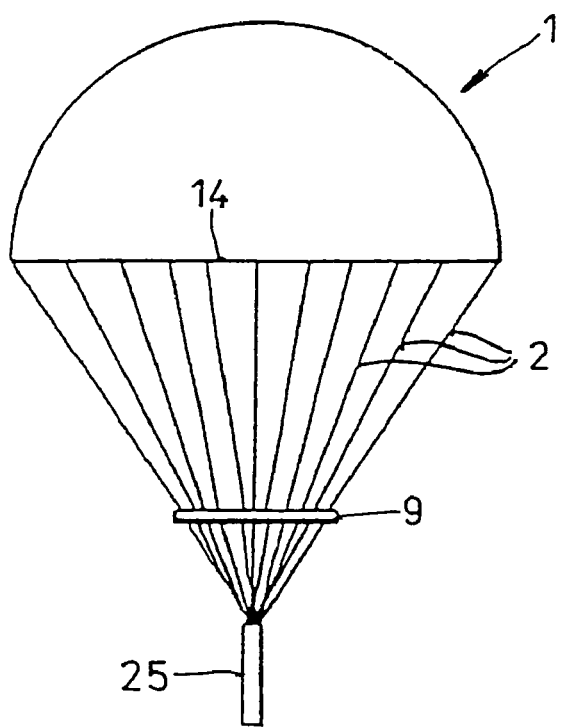
FIG. 9 show the processual phase of the canopy opening of the life parachute in dependence on the position of the glider on suspension parachute cords.

According to FIG. 1 the life parachute comprises the canopy 1 formed with single wedge-shaped sections taken up with their limitation 20, to their bottom edges 14 are fixed the suspension parachute cords 2, ended with a guy gear 15 for a rescued object 25 to be hung (FIGS. 8 and 9). The canopy 1 of the life parachute is fitted with the pole opening 4 and the chosen wedge-shaped sections 3 of the canopy 1 are, in the upper half of its height, fitted with the discharge valve 5 of the air situated in the inside space of the fast opening canopy 1 and also of the full open canopy 1 of the life parachute. The formed discharged valves 5 are, in the range of the relevant wedge-shaped section 3 overlapped with the parachute material 6 with the bottom open end 7 for an easy overpressure air outlet in direction of the first arrow 27. By the type according to FIG. 1 the discharge valves 5 are preposed with the loose vents 8 of which surface is not limited respectively reduced by any means.

The pole opening 4 including the discharge valves 5 eliminate the pension impact of air and overload of the suspension parachute cords 2 in the phase of fast opening of the canopy 1 before its full opening and in the first phase of its full opening.

After equalizing the pressure ratio in the inside space of the canopy 1 the pole opening 4 and the discharge valves 5 cease to discharge their function in single wedge-shaped sections 3 of the canopy 1. To advantage in the bottom open end 7 of the parachute material 6 overlapping the discharge opening 5 can be sewn up or otherwise fixed a strip 18 of elastic material which clamps the loose end of the parachute material 6 to the outer surface of the canopy 1, wherein the discharge valve 5 is out because the flowing air is from the inside space of the canopy 1 does not pass over the camping effect of the elastic strip 18. Some bottom open ends 7 of the parachute material 6 can be at least fitted with the elastic strip 18. The number of the discharge valves 5 in the canopy 1 of the life parachute is close in dependence to the size respectively of the surface of the canopy 1 and as well in respect to the mass of the rescued object 25 (FIGS. 8 and 9).

Figure 5:
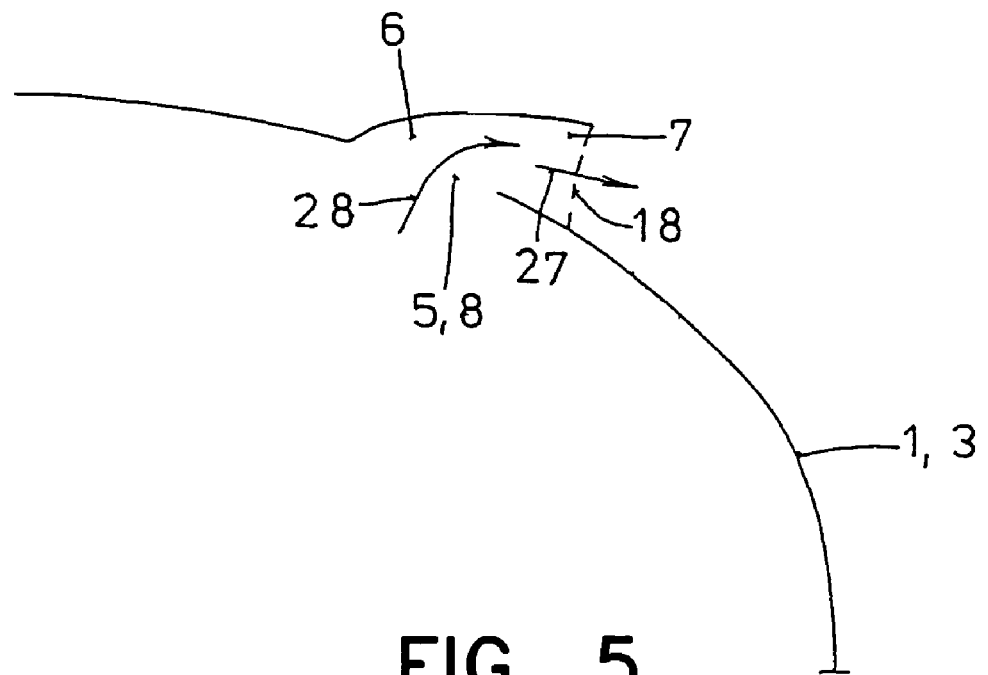
FIG. 5 shows the discharge valve of the canopy of the life parachute with the loose vent.

A side face of the solution of the discharge valve 5 according to FIG. 5 is shown in FIG. 5 wherein the overpressure air from the inside space of the canopy 1 passes through the loose vent 8 of the discharge valve 5 in direction of the second arrow 28 and consecutively leaves the bottom open end 7 of the parachute material 6 in direction of the first arrow 27.

Figure 4:
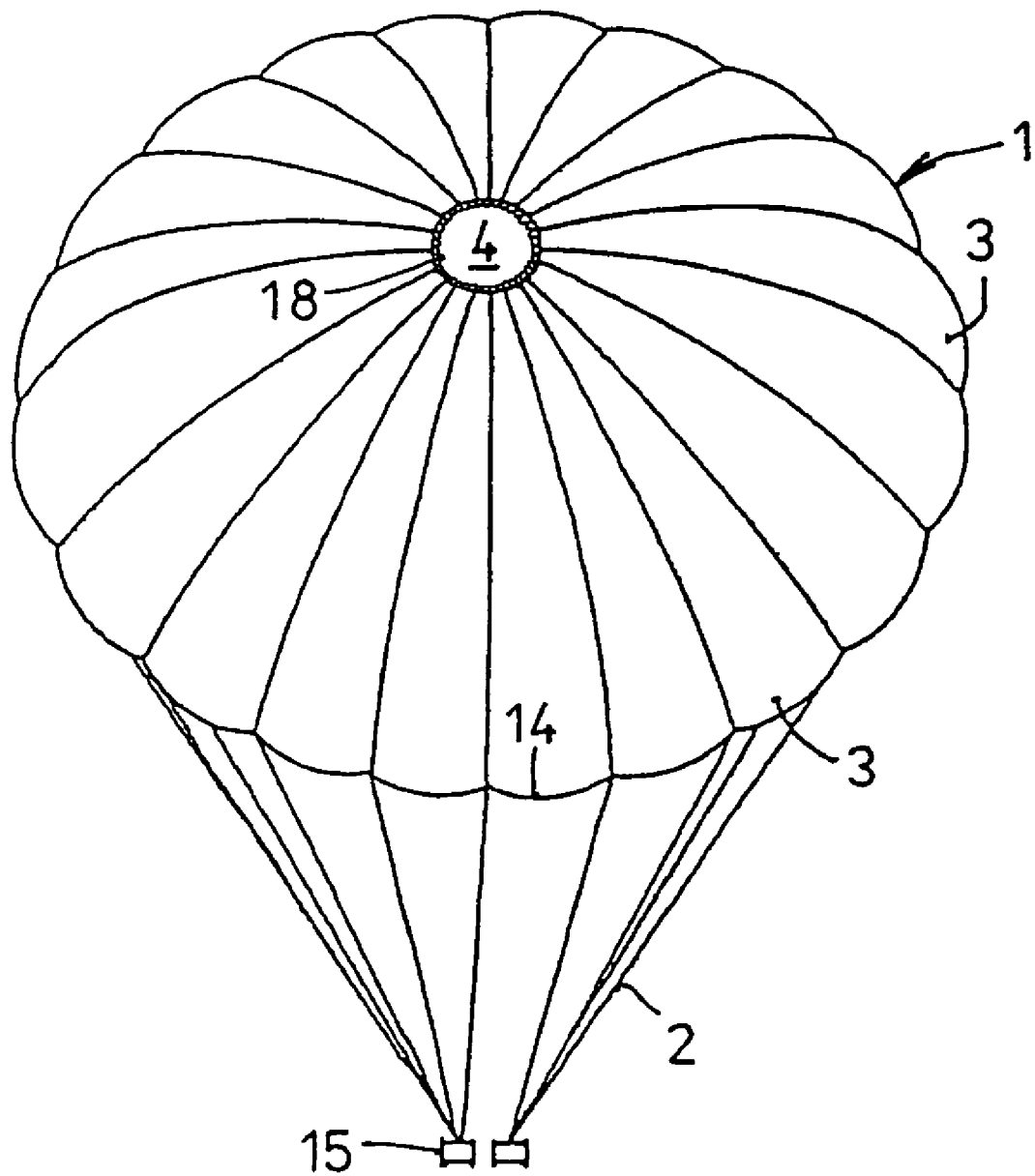
FIG. 4 is a spatial view at the canopy of the life parachute with the pole opening.

An analogical case is by the elastic strip 18 in the bottom open end 7 of the parachute material 6, the perimeter of the pole opening 4 (FIG. 4) can be fitted with the strip 18 of elastic material and for the same reason and also with the same effect.

For stiffness reasons the bottom open end 7 of the parachute material can be clamped through the guy cord 16 led together with the suspension parachute cords 2 to the guy gear 15 of the life parachute. The guy gear 16 is not possibly damaged with the flowing pressure air by full load of the bottom open end 7 of the parachute material 6.

Figure 2:
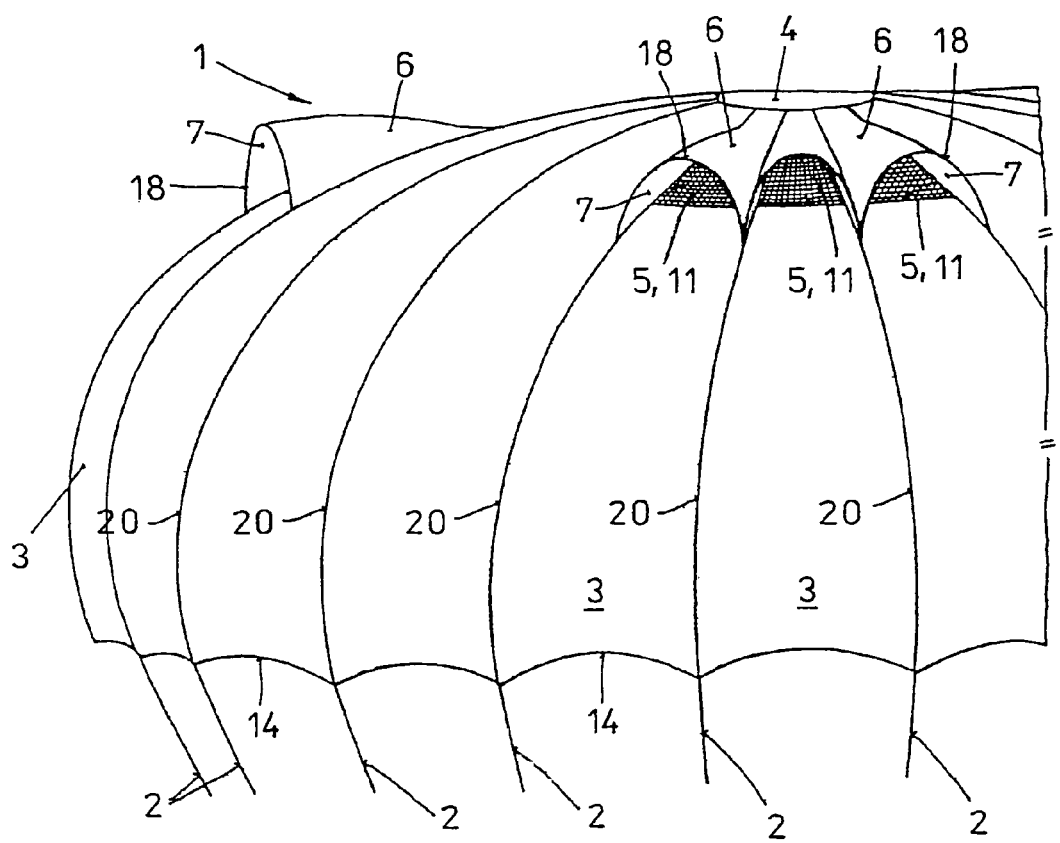
FIG. 2 is a detail of the full open canopy of the life parachute with the discharge valves arranged in some wedge-shaped sections of the canopy.
Figure 6:
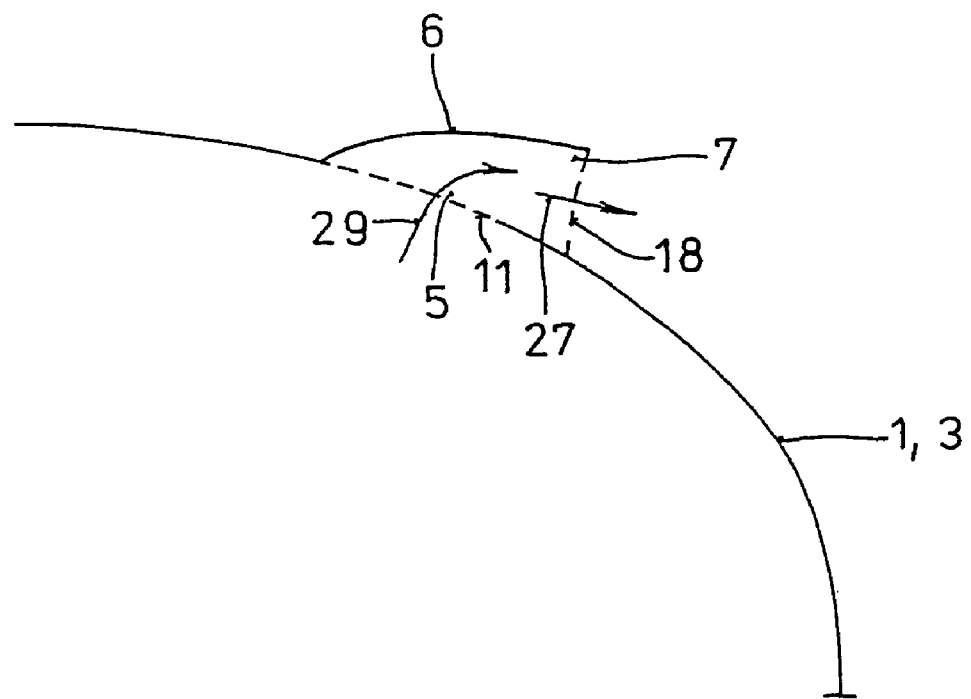
FIG. 6 shows the discharge valve of the canopy of the life parachute with the vent fitted with netting.

The part of the canopy 1 of the life parachute shown in FIG. 2 has the discharge valves 5 overlapped with the netting 11, over them is again the parachute material 6 ended with the bottom open end 7. The rest of the structure of the canopy 1 is the same with the structure according to FIG. 1. Side face the solution of the discharge valve 5 according to FIG. 2 is shown in FIG. 6, where the overpressure air from the inside space of the canopy 1 passes through the netting 11 of the discharge valve 5 in direction of the third arrow 29 and consecutinely leaves the bottom open end 7 of the parachute material 6 in direction of the arrow 27.

Figure 3:
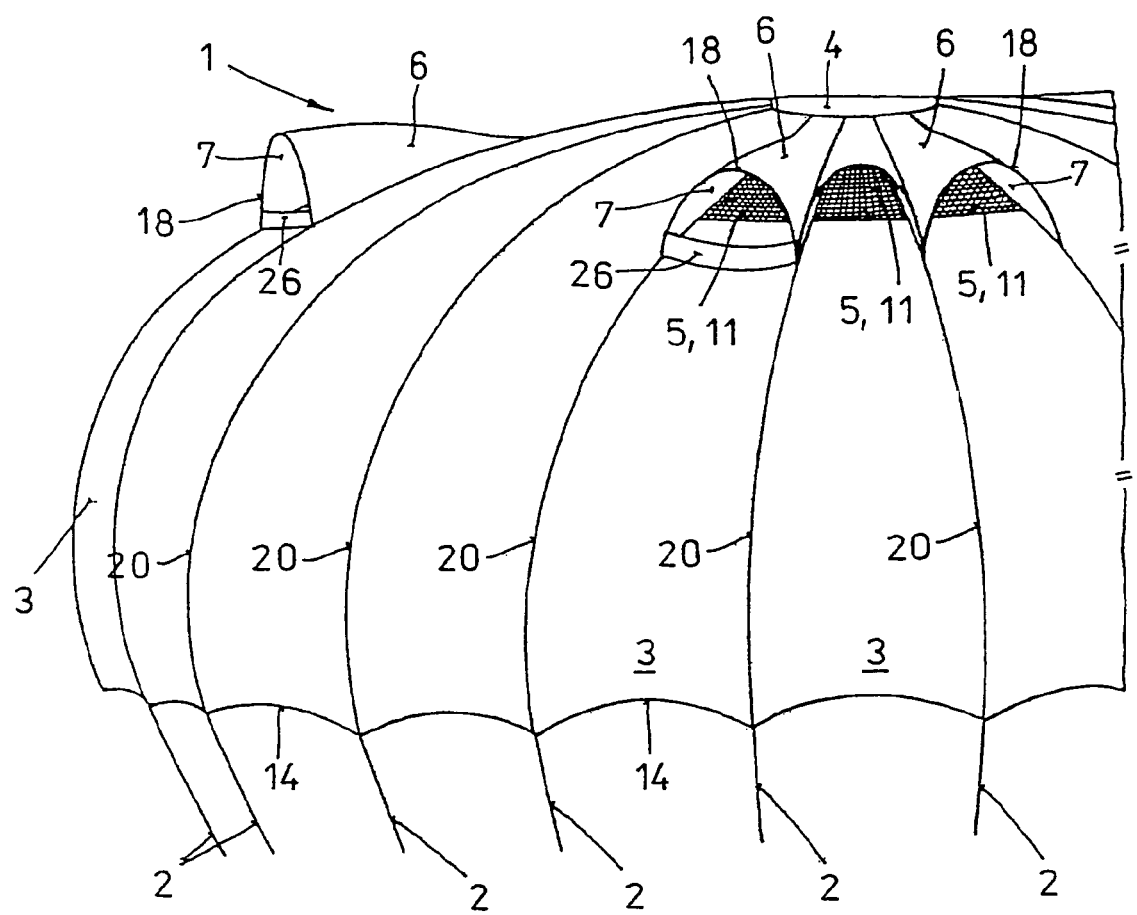
FIG. 3 is a detail of the full open canopy of the life parachute of FIG. 2 completed with the structure of an antiflap.

The type of the canopy 1 of the parachute according to FIG. 3 is compared with its structure shown in FIG. 2, completed with the antiflap 26 which is made of textile material. The antiflap 26 is placed under the bottom open end 7 of the parachute material 6 from the outer side of the canopy 1 in the width of its wedge-shaped section 3. The height of the antiflap 26 is chosen so that the bottom open end 7 of the parachute material 6 is overlapped with this antiflap 26 by a considerable pressure drop of the air leaking from the inside space of the canopy 1 through the discharge valve 5. This is the way when the discharge valve 5 limits very much or nearly stands in the way of the air leakage from the inside space of the canopy 1. The antiflap 26 can be used together with the elastic strip 18 fixed in the bottom open end 7 of the parachute material 6 or also in cases when the bottom open end 7 of the parachute material 6 is not fitted with the elastic strip 18.

Figure 7:
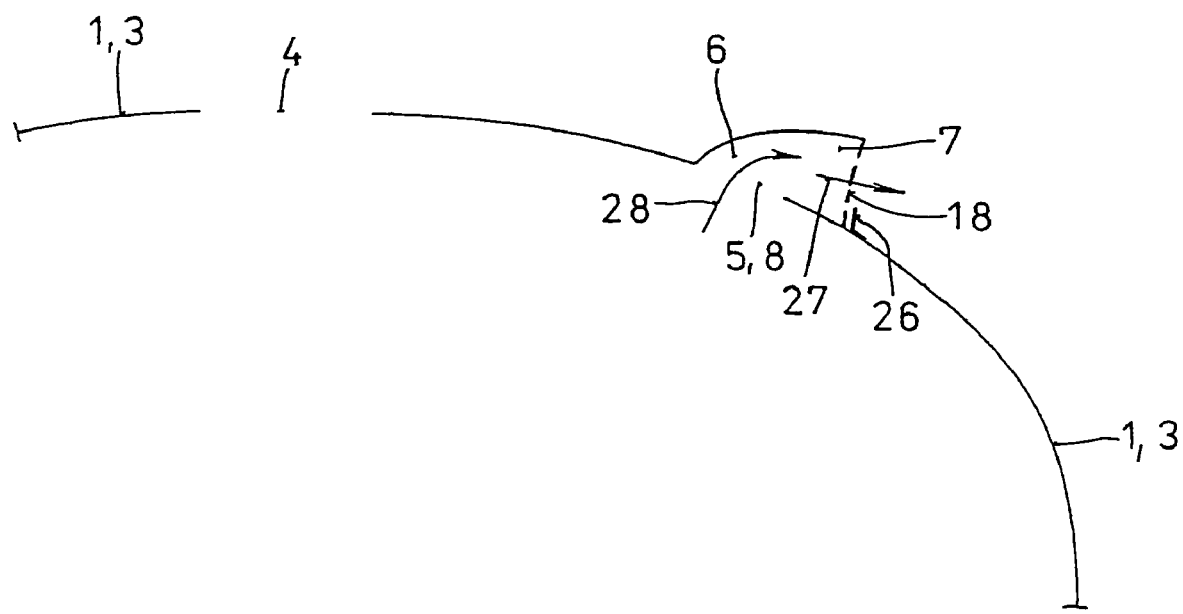
FIG. 7 shows the discharge valve of the canopy of the life parachute with the loose vent of FIG. 5 which is completed with the structure of the antiflap, FIG. 8.

A side face the solution of the discharge valve 5 with the antiflap 26 is shown in FIG. 7 in the phase when the overpressure air from the inside of the canopy 1 passes through the loose vent 8 of the discharge valve 5 in direction of the second arrow 28 and consecutively leaves the bottom open end 7 of the parachute material 6 in direction of the first arrow 27. The strip 18 of elastic material is sewn up in the bottom open end 7. The antiflap 26 and the elastic strip 18 work by the pressure drop of the air leaking from the inside space of the canopy 1. In this phase the bottom open end 7 of the parachute material 6 clamps to the outer surface of the canopy 1 and this parachute material 6 is still overlapped with the antiflap 26.

In FIG. 8 is shown a phase of opening the canopy 1 of the life parachute with the slider 9 placed at the parachute cords 2 in the top position, that is in a position under the bottom position 14 of the canopy 1. The suspension parachute cords 2 are ended with a parachute load in the form of a rescued object 25. According to FIG. 9 the canopy 1 of the life parachute mostly open and the slider 9 is in the bottom position. The purpose of the slider 9 is to slow down opening the canopy 1 of the life parachute and in that way to limit an air power impact acting partly on the material of the canopy 1 and partly on the suspension parachute cord 2 as a result of the suspended rescued object 25.

Figure 10:
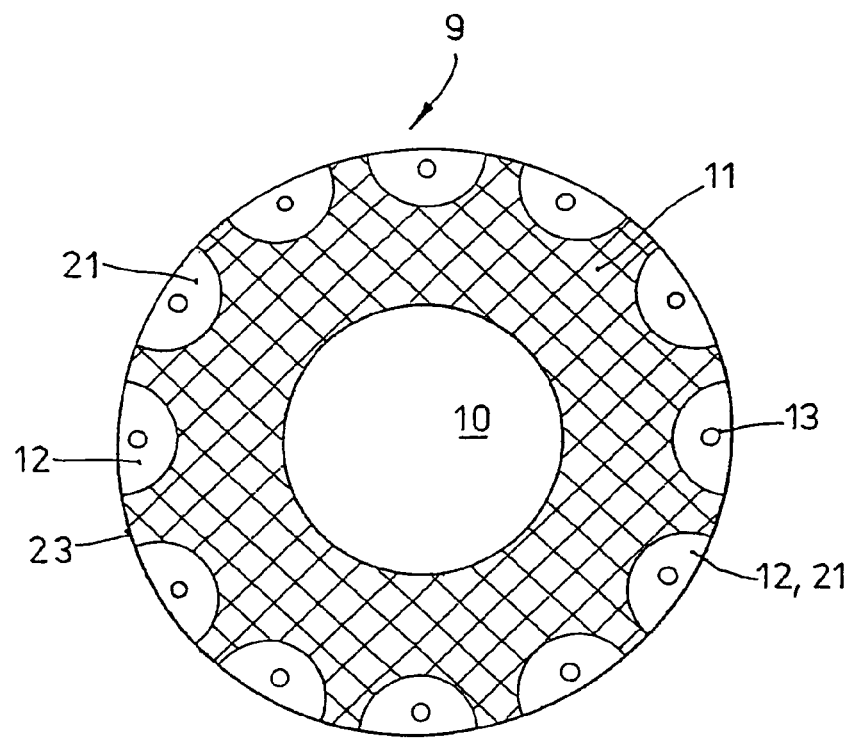
FIG. 10 shows the slide in the form of an annular form.
Figure 11:
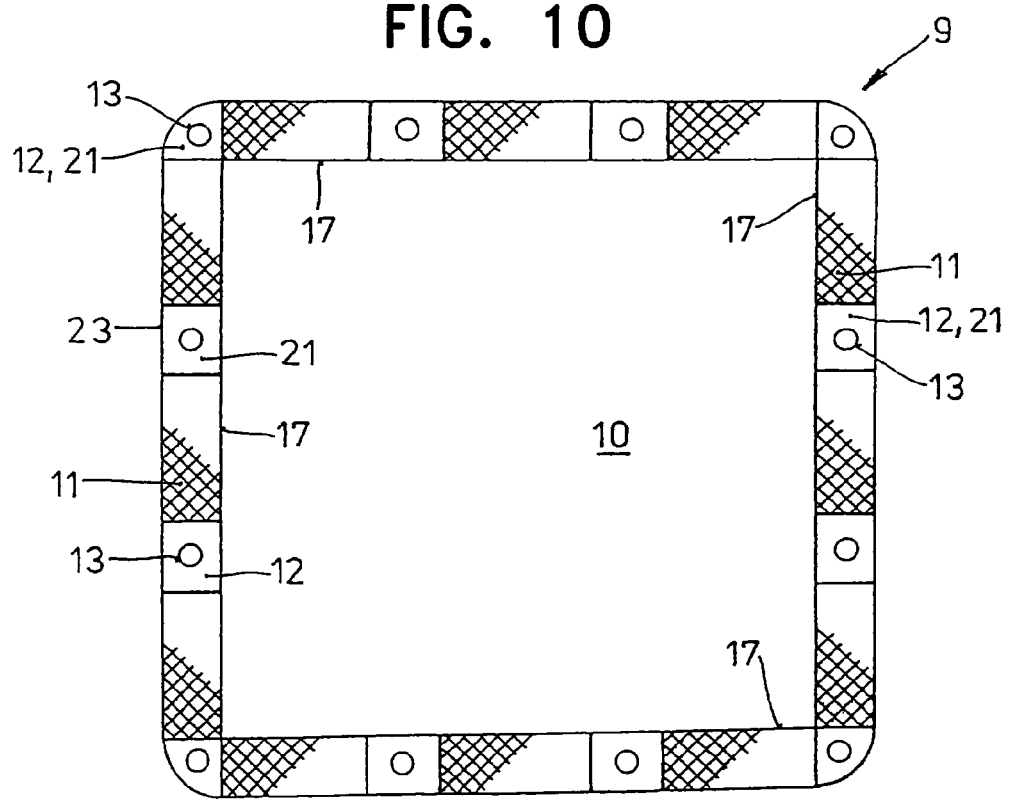
FIG. 11 shows the slide in the form of a regular quadrangle with the local stiffeners.

An exemplary type of the slider 9 is partly in FIG. 10 and in FIG. 11.

Figure 12:
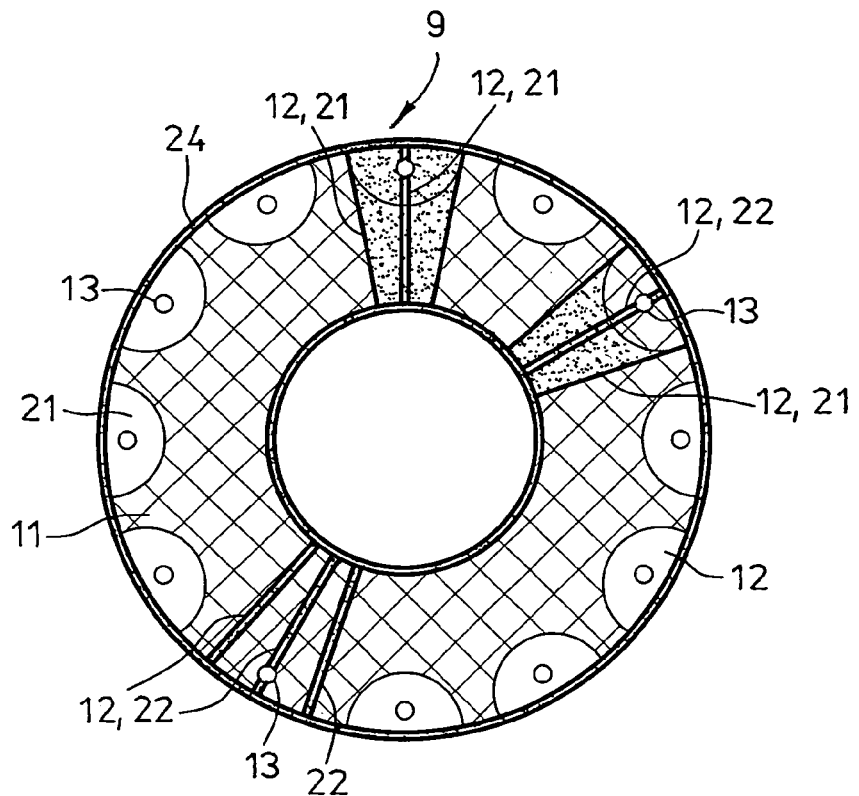
FIG. 12 is a variant style of the slide in the form of a circular ring with the local stiffeners.

According to FIG. 10 the slider 9 has the round figure and its central opening 10 is also in the round form. In an alternative not shown type the central opening 10 can be made as a polyhedric opening. According to FIG. 10 the slider 9 is in ring shape made with the netting 11 between the perimeter edge 23 and the central opening 10, wherein the local stiffeners 12 in the halfround form are adjusted in peripheral edges 23 of the slider 9. The local stiffeners 12 are of the textile flat material 21 having through opening 13 for the suspension parachute cord 2 or the suspension parachute cords 2. The type of the slider 9 of the netting 11 reduces its active surface and so its motion is also accelerated at the suspension parachute cords 2 in direction to a load in the form of the rescued object 25 (FIGS. 8a and 9) in the phase of opening the canopy 1. By an advantageous type of slider 9 according to FIG. 10 partly the perimeter of central opening 10 partly the outer peripheral edge 23 of the slider 9 can be fitted with the stiffening strip 24 (FIG. 12). Neighbourhood of the through opening 13 can be stiffened with not shown metallic bushing to an advantage.

Figure 13:
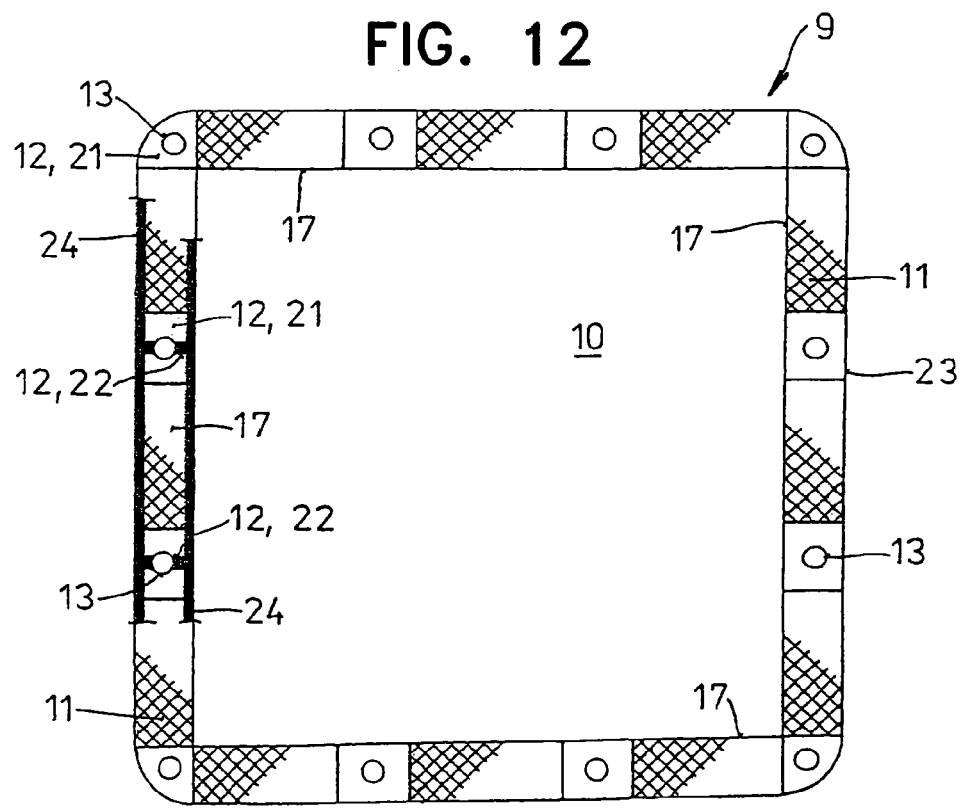
FIG. 13 is a variant style of the slide in the form of a regular quadrangle with the local stiffeners and the stiffening strips.

According to FIG. 11 the slider 9 is formed in a regular quadrangle figure composed of single tetrahedral parts 17 of the netting 11 which are connected to one another between them through the local stiffeners 12 made of the textile flat materiál 21 and fitted with the through opening 13 for the suspension parachute cord 2 or for the suspension parachute cords 2. In an advantageous type of the slide 9 according FIG. 11 partly the perimeter of the central opening of the slider 10 partly the outer peripheral edge 23 of the slider 9 can be fitted with the stiffening strip 24 (FIG. 13). To advantage the neighbourhood of the through opening 13 can be stiffened with the not shown metallic bushing.

The slider 9 according to FIG. 12 is partly the perimeter of the central opening 10 partly the outside peripheral edge 23 fitted with the stiffening strip 24. The local stiffeners 12 are in one case of the type of the slide slider 9 made of textile flat material 21 in triangular form which is fitted with the through opening 13 for the suspension parachute cord 2 or the suspension parachute cords 2. In the not shown type of this slider 9 the local stiffeners 12 can be also made of the textile flat materiál 21 in the quadrangle form which is fitted with the through opening 13 for the suspension parachute cords 2. The neighbourhood of the opening 13 can be stiffened with the not shown metallic bushing which can be placed only in the edge of the outer stiffening strip 24.

In another case of the type of the slider 9 according to FIG. 12 the local stiffeners 12 formed with triple bands 22 placed between stiffening strips 24 pertaining to the outer peripheral edge 23 of the slider 9 and the central opening 10 of the slider 9. In the respective band 22 of the local stiffeners 12 is the through opening 13 for the suspension parachute cord 2 or for the suspension parachute cords 2. The bundled bands 22 of the local stiffeners 12 can form a figure similar to the triangle (obr. 12) or a quadrangle which is not shown in FIG. 12. Stiffening the neighbourhood of the through opening 13 can be carried out with the not shown metallic bushing which can be placed only in the own edge of the outer stiffening strip 24.

The slider 9 according FIG. 13 issues from the structure of the slider 9 according to FIG. 11 with the difference that so the perimeter of the central opening 10 as the outer peripheral edge 23 is fitted with the stiffening strip 24. Between the single tetrahedral parts 17 of the netting 11 is placed always one through opening 13 adjusted in the local stiffener 12 formed with the band 22 or the bands 22. In an alternative type of the slider 9 according to FIG. 13 the tetrahedral parts 17 of the netting 11 are connected to one another through the textile flat material 21 as the local stiffeners 12 which is fixed to at least one band 22 to form another local stiffener 12. The through opening 13 for the suspension parachute cord 2 or for the suspension parachute cords 2 is then led with both the local stiffeners 12 arranged close over themselves. An alternative type of the slider 9 according to FIG. 13 the neighbourhood of each through opening 13 can be stiffened with a not shown metallic bushing to advantage. This metallic bushing can be placed only in the edge of the outer stiffening strip 24.

The invention claimed is:

1. A life parachute for ultra-lightweight aircrafts or lightweight aircrafts, said life parachute comprising
   a canopy formed by single wedge-shaped sections,
   suspension parachute cords fastened on bottom edges of the wedge-shaped sections for suspending an object being rescued, the canopy being fitted at one end with a central opening,
   at least some of the wedge-shaped sections of the canopy being in an upper half of its height fitted with a discharge valve for air from an inside space of the canopy, the discharge valves being in a widthwise direction of the single wedge-shaped sections covered with parachute material, the parachute material having a bottom open end, and
   a slider installed on the suspension parachute cords in a shape of a regular polygon with a central opening consisting of sectional quadrangular parts made of netting, the sectional quadrangular parts being mutually interconnected by reinforcements, the reinforcements having through openings for passage therethrough of the suspension parachute cords.

2. The life parachute as claimed in claim 1, wherein the discharge valves are formed with the netting.

3. The life parachute as claimed in claim 1, wherein a strip of elastic material is fixed in a bottom open end of the parachute material.

4. The life parachute as claimed in claim 1, wherein a counter-flap, made of textile material, is formed on an outer side of the canopy in a full width of the wedge-shaped section under a bottom open end of the parachute material.

5. The life parachute as claimed in claim 1, wherein the reinforcements are made of a textile material and from bands of a triangular shape created from planar material arranged side by side, while the reinforcements are created between a circumferential edge of the slider and the central opening of the slider.

6. The life parachute as claimed in claim 1, wherein the reinforcements are made of a textile material and from bands of a quadrangular shape created from planar material arranged side by side, while the reinforcements are created between a circumferential edge of the slider and the central opening of the slider.

7. The life parachute as claimed in claim 1, wherein a perimeter of the central opening of the slider is fitted with a stiffening strip made of textile material.

8. The life parachute as claimed in claim 1, wherein a peripheral edge of the slider is fitted with a stiffening strip made of textile material.

* * * * *